United States Patent Office
3,514,493
Patented May 26, 1970

3,514,493
PROCESS FOR THE DIMERIZATION OF PRIMARY AND SECONDARY ALCOHOLS
Gianfranco Pregaglia and Guglielmo Gregorio, Milan, Italy, assignors to Montecatini Edison S.p.A., Milan, Italy, a corporation of Italy
No Drawing. Filed May 15, 1967, Ser. No. 638,617
Claims priority, application Italy, May 18, 1966, 11,325/66
Int. Cl. C07c 29/00, 141/04
U.S. Cl. 260—642
9 Claims

ABSTRACT OF THE DISCLOSURE

Process for dimerization of a non-branched primary alcohol, a secondary alcohol, or mixtures of a non-branched primary alcohol with a primary alcohol branched in the 2-position. Utilizes an alkaline condensing agent and a catalyst that is either a supported metal wherein the metal is Pt, Pd, or Ru, or is Rh (supported or unsupported). Condensation carried out at from about 80 to 300° C., and preferably from about 110 to 160° C.

BACKGROUND OF THE INVENTION

(1) Field of the invention

The present invention relates to a process for the dimerization of primary and secondary alcohols.

(2) Description of the prior art

Heretofore it has been known to react two alcohols whereby the reaction proceeds with the elimination of one molecule of water, giving rise to an alcohol having a branched chain in the 2-position as for instance:

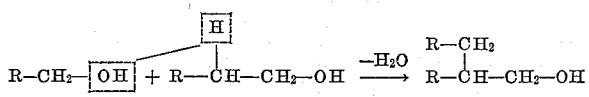

This reaction scheme is typical of the Guerbet reaction [see Ang. Chem. 64, 213 (1952)], which reaction takes place at a high temperature by heating the alcohols in the presence of an alkaline material and gradually removing the water as it forms. The condensing agents for this reaction are the alkoxides and the hydroxides of alkali metals, which agents are active when used at temperatures of from about 200° to 300° C. Under these conditions, dimerization occurs with sufficient speed, however carboxyl acids form contemporaneously, with the resulting disadvantage of loss of desired product and condensing agent (acid-base reaction). In order to obviate this inconvenience, methods have been prepared which are based on the use of (1) different types of alkaline substances, for instance, carbonates or phosphates [see Ind. and Eng. Chem. 53, 33 (1961)], or (2) particular operating conditions (see, e.g., Dutch patent application No. 6409995).

In order to overcome the difficulties encountered when working at temperatures exceeding 200° C., particularly with respect to alcohols having relative low boiling points, methods have been used wherein the reaction is catalyzed by means of heavy metals, for instance nickel, palladium, copper, or the oxides thereof, which, when employed in amounts exceeding 1–2% by weight with respect to the reacting mixture, permit one to achieve a sufficiently rapid conversion at 160–180° C. However, the selectivity of the reaction is reduced by formation of both acids (that are found as alkaline salts) and carbonyl products which are most difficult to separate from the desired product.

If the dimerization reaction could be performed at temperatures hardly in excess of about 100° C. using a highly selective catalyst, a number of advantages would be achieved. Thus, it would be possible to permit the major portion of the alcohols to react at atmospheric pressure. The secondary formation of acids would be reduced such that small amounts of alkaline condensing agent would be sufficient for the conversion of large amounts of alcohols and, in addition, a high purity in the crude reaction product could be obtained. Another remarkable advantage would be the possibility of removing the reaction water by azeotropic distillation, under atmospheric pressure, in the dimerization of alcohols having boiling points up to about 160° C.

SUMMARY OF THE INVENTION

We have now surprisingly found that the dimerization of alcohols can be achieved with high conversion rate and with excellent selectivity at temperatures lower than 160° C., by using as the catalyst a metal of the platinum group, in particular palladium, platinum, rhodium, or ruthenium, in particularly active form and, as the condensing agent, an alkali metal or a derivative thereof exhibiting basic reaction characteristics, under the foregoing reaction conditions.

Our invention provides a process for the dimerization of (1) non-branched primary alcohols or secondary alcohols having the general formula:

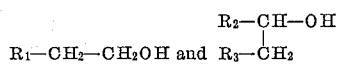

respectively, wherein $R_1$ is alkyl, cycloalkyl, aryl, or aralkyl and contains from 1 to 20 carbon atoms; and $R_2$ and $R_3$ are alkyl radicals containing from 1 to 6 carbon atoms or taken together with the carbon atoms to which they are bound constitute a cyclo-aliphatic ring containing from 5 to 12 carbon atoms, or (2) of mixtures of the aforesaid non-branched primary alcohols with primary alcohols branched in the 2-position and of the formula

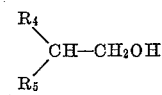

wherein $R_4$ and $R_5$ are the same or different alkyl radicals containing from 1 to 10 carbon atoms, to thereby obtain primary or secondary alcohols having a branched chain in the 2-position.

The process comprised heating and condensing the aforesaid primary or secondary alcohols in the presence of alkaline condensing agents and removal of the water formed, condensation wherein there is employed, in addition to the alkaline condensation agent, a catalyst which is either a metal deposited on a non-metallic support wherein the metal is selected from the group consisting of platinum, palladium, rhodium, and ruthenium, or is rhodium in finely subdivided state, the condensation being carried out at a temperature of from about 80° to 300° C., and preferably from about 110° to 160° C.

DESCRIPTION OF THE PREFERRED EMBODIMENTS

There may be employed commercial catalysts of the aforementioned metals, deposited on supports such as alumina, calcium carbonate, calcium sulfate, or preferably, activated carbon. Desirably the support is thus finely pulverized such that at least 80% of the granules have a particle diameter less than 150 microns and at least 20% of the granules have a particle diameter less than 50 microns, such support containing from 0.1 to 50% by weight of metal therein. When rhodium is employed, it can be obtained in sufficiently active form by precipitation from alcohol solutions of a salt thereof, so that a support is not required.

The foregoing is particularly surprising inasmuch as the same metals in different form, for example palladium deposited on carbon having a large granules or precipitated from palladium salts, are less active.

The noble metal used as the catalyst is desirably employed in an amount from 0.0001 to 10 parts by weight, preferably from 0.002 to 1 part by weight, per 100 parts of alcohol. Of course, large amounts of the metal catalyst may be employed, but would remain in the heterogenous phase. Such larger amounts would not adversely affect the reaction, but this is not convenient economically.

When a support is used, the amount employed, with respect to the noble metal, may vary from 0.1:1 to 1000:1 (expressed on a weight basis). The preferred support is activated charcoal.

The amount of alkaline condensing agent employed may vary over a wide range with respect to the recting alcohol(s). Generally the alkaline condensing agent will be employed such that there is from 0.1 to 50 mols, preferably from 2 to 10 mols, per 100 mols of alcohol. Suitable alkaline condensing agents include metallic sodium, sodium propoylate, caustic soda, sodium carbonate, sodium amide, metallic potassium, potassium amide, potassium hydrate, potassium carbonate, potassium phosphate, and the like.

The reaction can be carried out over a wide range of temperatures, generally from about 80° to 300° C. The reaction will proceed equally well at temperatures in excess of 300° C., but in such case the advantages described previously are minimized or lost altogether.

The rate of conversion will depend on the temperature and on the particular alcohols used, but in any event is higher than that obtainable by conventional methods, particularly when taking into account the small amount of catalyst employed. For instance, in the presence of 0.5% by weight of solid catalyst there is obtained a conversion of 10%/hour when operating at 120° C. with n-butanol at the boiling point and respectively, of 40%/hour when operating at 160° C. with n-hexanol at the boiling point.

The alcohols that are branched in the 2-position will condense with the linear alcohols; they are, however, less reactive than the latter. As a consequence, when reacting according to the process of our invention a linear alcohol containing smaller amounts of a branched alcohol, the reaction product consists almost exclusively of the dimer of the linear alcohol. For instance, when reacting technical butanol which contains isobutanol as an impurity, a practically pure 2-ethylhexanol is obtained as the reaction product.

The removal of the reaction water may be effected (1) by employing a suitable dishydrating agent, for example CaO or MgO, or (2) by azeotropic distillation. The latter procedure is particularly advantageous in the dimerization of alcohols containing from 4 to 6 carbon atoms and having a boiling point in the range of from 110° to 160° C., by operating under atmospheric pressure.

Unreacted alcohol is easily separated by distillation from the reaction product, which in turn is distilled to separate it from minor amounts of high-boiling products. The thus prepared product exhibits a remarkable purity. In particular, the content of carbonyl substances is quite low as compared to the product prepared by performing the Guerbet reaction according to the conventional method at temperatures higher than 200° C.

Our process is most advantageous in those instances where the resulting alcohols are to be used for the production of plasticizers.

Another application of the alcohols obtained according to the present invention is in the field of surface-active agents for the preparation of sodium alkyl sulphates.

The following examples will further illustrate our invention:

EXAMPLE 1

(A) 1.3 g. of sodium were reacted with 161 g. of butanol, thus obtaining a diluted solution of sodium butylate. In this solution there was suspended 0.5 g. of activated carbon containing 10% by weight of palladium. This catalyst had the following particle size:

22% of the granules have a particle diameter below $10\mu$
32% of the granules have a particle diameter between $10-20\mu$
33% of the granules have a particle diameter diameter between $20-40\mu$
13% of the granules have a particle diameter above $40\mu$.

The solution was brought to boiling point and the $H_2O$-butanol azeotrope was distilled in a Widmark column and dissociated, thus enabling one to recycle the butanol into the column. After 5 hours, 7 g. of water were collected, while the temperature in the boiler grandually increased from 118° to 124° C. The distillation was then stopped and the palladium-impregnated carbon was filtered off. Water working was carried out to remove the alkaline substances together with the sodium butyrate formed during the reaction, and distillation was performed in a short cloumn, recovering the unreacted butanol (90 g.). The residue was distilled under reduced pressure, separating 3 fractions:

(1) A fraction containing small amounts of butanol along with butylbutyrate as an impurity,
(2) 52 g. of 2-ethylhexanol,
(3) 2.5 g. of high-boiling products.

Fraction 2 was analyzed by gas-chromatography and was shown to consist of 2-ethylhexanol (99%) and butylbutyrate (1%).

(B) (Comparative example), by way of comparison, a test of the same duration and with the same amounts of reactants was performed, but using, as the catalyst, 25 g. of activated carbon in 4–8 mm. sized granules containing 1% by weight of palladium (i.e., an amount of palladium 5 times higher than the amount used in part A). 4 g. of 2-ethylhexanol were obtained and the sodium butylate was converted quantitatively into sodium butyrate.

EXAMPLE 2

(A) To 57.4 g. of hexanol, 0.52 g. of sodium (4% by mols) was added. When the sodium was completely dissolved, 200 mg. of carbon containing 10% of palladium were added and the mixture was brought to the boiling point, separating the water that developed in a Dean-Stark type separator. The catalyst had the same particle size as in Example 1.

After one hour of reaction, 2.1 cc. of water were collected corresponding to a conversion of 42%. The temperature of the boiling mixture had gradually raised from 155° to 164° C.

The carbon was filtered off, followed by washing and distillation (as in Example 1), thereby separating 3 fractions which were analyzed by gas-chromatography:

(1) 30 g. consisting of 21 g. of unreacted hexanol and 9 g. of 2-butyloctanol (separated by rectification):
(2) 18 g. of virtually pure 2-butyloctanol;
(3) 3 g. of undistillable products.

(B) (Comparative example), by way of comparison, a test was carried out, operating according to the conventional art. To 57.4 g. of hexanol containing 0.52 g. of sodium, 0.6 g. of Raney Nickel was added. The mixture was brought to the boiling point, collecting over 3 hours the water that separated (0.9 cc. corresponding to a conversion of 18%).

43 g. of hexanol were recovered and a total of 9 g. of high-boiling products (80% being 2-butyloctanol) were isolated.

EXAMPLE 3

To 158.5 g. of butanol containing 2.7% of sodium butylate, 500 mg. of carbon containing 10% of platinum were added. The catalyst had the same particle size as in Example 1. The mixture was refluxed, separating in a Widmark column the water that developed from the reaction as water-butanol azeotrope.

After 20 hours an amount of water was separated which corresponded to a conversion of 45%.

After elimination of the catalyst and of the alkaline salts, the following products were separated by distillation:

90 g. of butanol, 55 g. of 2-ethylhexanol, and 10 g. of undistillable residue.

EXAMPLE 4

To 164 g. of butanol at its boiling point there were added 3.6 of roughly pulverized sodium hydrate and 500 mg. of palladium-impregnated carbon containing 10% of palladium. The catalyst had the same particle size as in Example 1.

The water-butanol azeotrope was slowly distilled in a Widmark column, separating the water and recycling the butanol into the column. After 8 hours of boiling, the preponderance of the butanol had been converted. Then the alcohols were filtered, washed with water, and separated by distillation. There were thus isolated: 9 g. of unreacted butanol, 130 g. of 2-ethylhexanol, and 10 g. of high-boiling products (higher alcohols).

EXAMPLE 5

1.8 g. of sodium were reacted with a mixture containing 10% by weight of isobutanol and 90% of normal butanol.

When the sodium was completely dissolved, 600 mg. of activated carbon containing 5% of palladium were added and the suspension was brought to the boiling point, followed by distilling the water-alcohols azeotrope and recycling the alcohols into reaction zone. The catalyst had the same particle size as in Example 1.

After 6 hours of boiling, the mixture was filtered, washed with water, and rectified. In the first fractions the unreacted butanol and isobutanol were separated, and in the successive fractions 65 g. of isooctyl alcohols were isolated.

The gas-chromatographic analysis showed that the mixture consisted essentially of 2-ethylhexanol (97%).

EXAMPLE 6

A suspension of metallic rhodium was prepared by boiling an alkaline solution of 200 mg. of $RhCl_3$ hydrate in 10 cc. of ethanol. The ethanol was decanted and 160 g. of butanol containing 3% by mols of sodium butylate were added. The whole was brought to the boiling point and the water-butanol azeotrope was distilled off while the butanol was recycled into reaction zone.

5 hours thereafter 2.5 cc. of water had separated. Then the reaction products were recovered and filtered and the solution was washed with water. The unreacted butanol was separated by distillation and, in turn, the high-boiling fraction (42 g.) was distilled off. This was shown by gas-chromatography to consist essentially of 2-ethylhexanol (95%).

EXAMPLE 7

2 g. of calcium carbonate in powder form and containing 5% of palladium were suspended in 200 cc. of butanol containing 3% by mols of sodium butylate (158 g. of butanol plus 5.7 g. of sodium butylate). 55% of this catalyst had a particle diameter lower than 50μ.

The mixture was boiled for 8 hours, distilling the water-butanol azeotrope and recycling the butanol into reaction zone.

After 8 hours of reaction the mixture was analyzed by gas-chromatography and was shown to consist essentially of 2-ethylhexanol (36%) and butanol (62%). High-boiling products were present in an amount of about 2%.

EXAMPLE 8

200 cc. (180 g.) of cyclohexanol were reacted with 1 g. (44 mmols) of metallic sodium. When the sodium was completely dissolved, 600 mg. of palladium-impregnated carbon (containing 5% palladium) were added, and the mixture was brought to boiling point, distilling the cyclohexanol-water azeotrope and recycling the cyclohexanol into the reaction zone. The catalyst had the same particle size as in Example 1.

After 2.5 hours a conversion of about 35% was noted, calculated on the basis of the separated water.

The catalyst was filtered off, followed by washing and distilling of cyclohexanol. The residue (62 g.) consists for 85% of an alcohol with 12 carbon atoms having boiling point at 160° C./40 torr (reported in literature for 2-cyclohexyl-cyclohexanol: 178° C./55 torr).

EXAMPLE 9

500 mg. of carbon powder containing 5% of ruthenium were suspended in 160 g. (200 cc.) of normal-amyl alcohol wherein 1.7 g. of sodium had previously been dissolved. The catalyst had the same particle size as in Example 1. The mixture was brought to the boiling point, distilling the water-alcohol azeotrope in a short column and recycling the separated alcohol into reeaction zone.

After 7 hours of reaction, 8 cc. of water had separated. The mixture was analyzed by gas-chromatography and shown to consist for 42% of an alcohol with 10 carbon atoms, the remainder being almost exclusively the starting alcohol (along with about 2% of high-boiling products).

EXAMPLE 10

A solution of 30 g. of normal-dodecanol and 8 g. of toluene was prepared. 7.4 mmols of roughly ground KOH were added and the mixture was boiled while keeping it under agitation. (The boiling point is at about 155° C.).

After removal of some drops of water, 300 mg. of 5% palladium-impregnated carbon were added and the boiling was continued, separating the water and recycling the dodecanoltoluene into reaction zone. The catalyst had the same particle size as in Example 1.

After 4 hours of boiling, about 1 cc. of water had separated. The mixture was then filtered, washed with water, and distilled under vacuum, recovering 6 g. of dodecanol and 4 g. of an intermediate fraction, and 18 g. of a heavier fraction. The heavier fraction had a boiling point of 200°–210° C./0.5 torr, and consisted essentially of 2-decyl-tetradecanol.

EXAMPLE 11

2 g. of metallic sodium were reacted with 160 g. of secondary butyl alcohol, thus obtaining a solution containing 87 millimols of alkoxide. In this solution there was suspended 1 g. of palladium-impregnated carbon powder containing 5% palladium. The catalyst had the same particle size as in Example 1. The suspension was refluxed for 6 hours at 97° C.

After cooling and separation of the alkali and the catalyst, the mixture was distilled, recovering the unaltered starting alcohol and a second fraction of 8 g. which consisted substantially (80%) of an alcohol having 8 carbon atoms.

EXAMPLE 12

0.8 g. of sodium were reacted with a mixture of 50 g. of n-hexanol and 100 g. of n-pentanol.

When the sodium was completely dissolved there was suspended therein 0.6 g. of palladium-impregnated carbon containing 5% of palladium. The catalyst had the same particle size as in Example 1. The whole was brought to its boiling point and the water-alcohols azeotrope was distilled off, recycling the alcohols into reaction zone.

After 2 hours of boiling the mixture was filtered, washed with water, and distilled, separating 2 fractions:

(1) from 135° to 157° C.: 40 g. of a mixture consisting essentially of the starting alcohols;
(2) from 115° C. to 145° C./20 torr: 95 g. of an alcohol mixture which as analyzed by gas-chromatography showed 3 substances that were not distinctly separable.

Variation can, of course, be made without departing from the spirit and scope of the present invention.

Having thus described our invention, what we desire to secure and hereby claim by Letters Patent is:

1. In a process for the dimerization of non-branched primary alcohols of the formula $$R_1—CH_2—CH_2—OH$$

secondary alcohols of the formula $$R_2—CH—OH$$
$$R_3—CH_2$$

or mixtures of one of said non-branched primary alcohols with a primary alcohol branched in the 2-position and having the formula $$\begin{array}{c}R_4\\ \phantom{R}\diagdown\\ \phantom{RR}CH—CH_2—OH\\ \phantom{R}\diagup\\ R_5\end{array}$$

wherein $R_1$ is selected from the group consisting of alkyl, cyclo-alkyl, aryl and aralkyl and contains from 1 to 20 carbon atoms; $R_2$ and $R_3$ are alkyl radicals containing from 1 to 6 carbon atoms, or taken together with the carbon atoms to which they are bound, constitute a cycloaliphatic ring containing from 5 to 12 carbon atoms; and wherein $R_4$ and $R_5$ are the same or different alkyl radicals and contain from 1 to 10 carbon atoms, to obtain a secondary alcohol having a branched chain in the 2-position: comprising heating and condensing at least one of the said alcohols in the presence of an alkaline condensing agent, and removing the water that forms, the improvement of employing for the condensation, in addition to said alkaline condensing agent, a catalyst consisting of a metal selected from the group consisting of platinum and palladium, said metal being deposited on activated carbon, and carrying out said condensation at a temperature of from about 80° to 300° C.

2. The process of claim 1 wherein the temperature at which said condensation is effected is from about 110 to 160° C.

3. The process of claim 1 wherein the catalyst is employed in an amount of from 0.0001 to 10 parts by weight, per 100 parts of solution.

4. The process of claim 3 wherein the amount of catalyst is from about 0.002 to 1 part by weight, per 100 parts of solution.

5. The process of claim 1 wherein said activated carbon is used in an amount, with respect to said metal, of between about 0.1:1 and 1000:1 parts by weight.

6. The process of claim 1 wherein the alkaline condensing agent is selected from the group consisting of metallic sodium, sodium propylate, caustic soda, sodium carbonate, sodium amide, metallic potassium, potassium amide, potassium hydrate, potassium carbonate, and potassium phosphate.

7. The process of claim 6 wherein the alkaline condensing agent is used in an amount of from about 0.1 to 50 mols, per 100 mols of alcohol.

8. The process of claim 7 wherein the amount of alkaline condensing agent, per 100 mols of alcohol, is from about 2 to 10 mols.

9. The process of claim 1 wherein there is employed a non-branched primary alcohol containing from 4 to 6 carbon atoms.

References Cited

UNITED STATES PATENTS

| | | | |
|---|---|---|---|
| 2,457,866 | 1/1947 | Carter | 260—642 |
| 2,848,495 | 8/1958 | Villemey | 260—585 |
| 2,865,963 | 12/1958 | Garetson et al. | 260—642 |
| 2,989,567 | 6/1961 | Leeds et al. | 260—642 |
| 2,971,033 | 2/1961 | Farrer | 260—631 |
| 3,119,880 | 1/1964 | Kollar et al. | 260—642 |
| 3,246,036 | 4/1966 | Winstrom et al. | 260—631 |
| 3,260,769 | 7/1966 | Marshall | 260—682 |

LEON ZITVER, Primary Examiner

J. E. EVANS, Assistant Examiner

U.S. Cl. X.R.

252—447; 260—617, 618, 631